United States Patent [19]

Hoeptner, III

[11] Patent Number: 4,457,741
[45] Date of Patent: Jul. 3, 1984

[54] TENSIONER

[76] Inventor: Herbert W. Hoeptner, III, 273 Hermosa, San Luis Obispo, Calif. 93401

[21] Appl. No.: 266,705

[22] Filed: May 26, 1981

Related U.S. Application Data

[63] Continuation-in-part of Ser. No. 19,557, Mar. 12, 1979, Pat. No. 4,291,416.

[51] Int. Cl.³ .................... F16H 7/12; B65H 59/10; F16D 11/00; F16B 2/00
[52] U.S. Cl. ................................. 474/138; 188/67; 192/111 A; 403/368
[58] Field of Search .............. 474/133, 138; 188/67; 192/111 A; 403/368

[56] References Cited

U.S. PATENT DOCUMENTS

| 847,164 | 3/1907 | Corn | 188/67 X |
|---|---|---|---|
| 1,031,637 | 7/1912 | Fischer | 188/67 X |
| 1,374,643 | 4/1921 | Fischbach | 474/138 |
| 1,744,746 | 1/1930 | Brown | 474/135 |
| 2,258,465 | 10/1941 | Mullaney | 474/135 |
| 2,368,848 | 2/1945 | Krueger | 474/135 X |
| 2,703,019 | 3/1955 | Burawoy | 474/138 X |
| 3,409,335 | 11/1968 | Piepho et al. | 474/138 X |
| 3,946,845 | 3/1976 | Kamio | 192/111 A |
| 4,040,305 | 8/1977 | Cadic | 474/135 |
| 4,068,750 | 1/1978 | Gatewood | 192/111 A |
| 4,086,996 | 5/1978 | Gatewood | 192/111 A |
| 4,177,689 | 12/1979 | Zeilinger et al. | 474/111 X |
| 4,270,906 | 6/1981 | Kraft et al. | 474/135 |
| 4,291,416 | 9/1981 | Hoeptner | 474/138 |

FOREIGN PATENT DOCUMENTS

| 647308 | 10/1962 | Italy | 474/138 |
|---|---|---|---|
| 2090938 | 7/1982 | United Kingdom | 474/138 |
| 304379 | 7/1971 | U.S.S.R. | 474/138 |

Primary Examiner—Lawrence J. Staab
Assistant Examiner—Michael D. Bednarek
Attorney, Agent, or Firm—William W. Haefliger

[57] ABSTRACT

A chain tensioner comprises a plunger yieldably urged and displaceable in one direction to transmit chain tensioning force to a chain, and a wedgable means co-acting with the plunger to block its retraction. Body structure associated with the plunger and wedgable means may incorporate an outer body and an inner body movable relative to the outer body and defining a ramp surface engaging the wedgable means.

12 Claims, 7 Drawing Figures

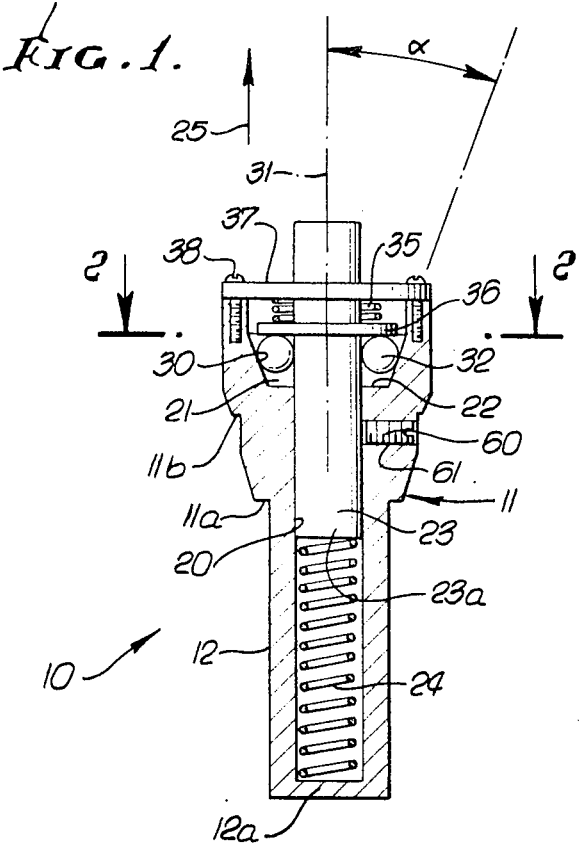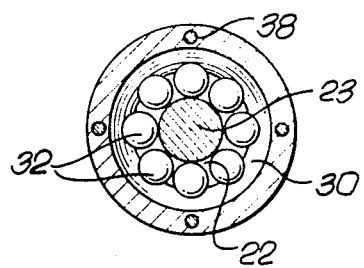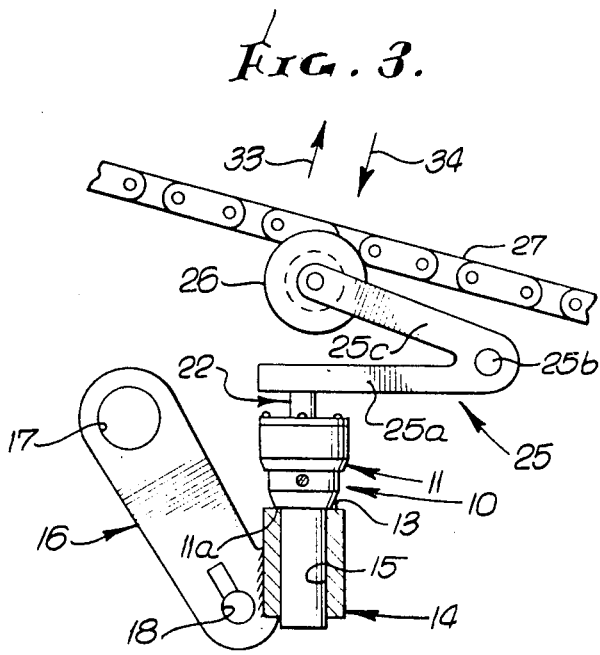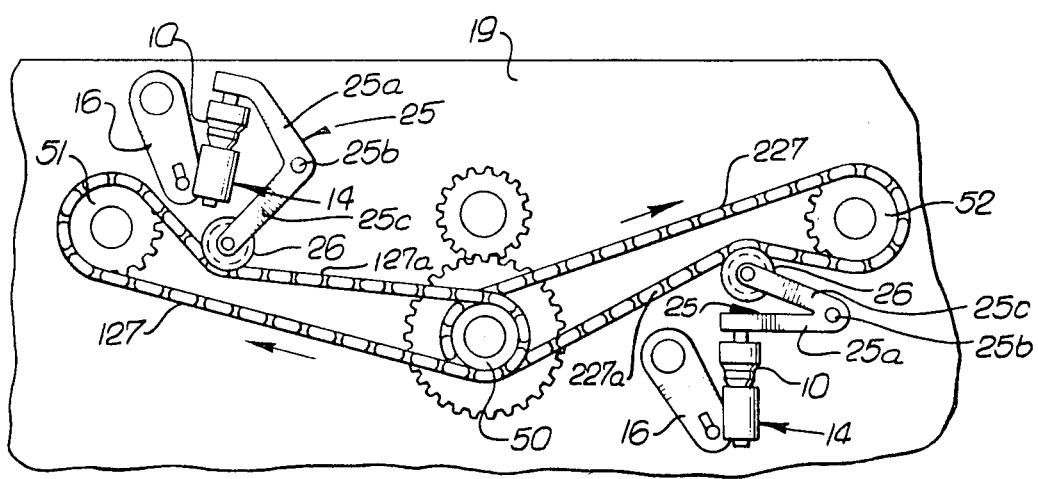

TENSIONER

BACKGROUND OF THE INVENTION

This application is a continuation-in-part of my prior application Ser. No. 19,557, filed Mar. 12, 1979.

This invention relates generally to tensioning apparatus, and more particularly concerns a mechanically ratcheting tensioner particularly well adapted to tension power transmitting flexible elements such as drive chains, belts, and the like.

Currently-in-use chain tensioners on certain vehicles employ a hydraulic ratcheting design. Fluid on one side of a piston is allowed to flow through a small opening at the top side of the piston to the opposite side. As a result, when the piston tries to return, the fluid is not able to flow back through the opening because a small spring loaded ball seals the hole. One problem with such a device stems from the need for seals to prevent loss of fluid. Seal wear leads to malfunction and risk of expensive damage to the engine due to chain slippage or vibration. Further, such devices require very accurate fits and precision matching, leading to high cost. Avoidance of such problems has led to the use of adjustable bolts to tension chains, the bolts being locked after their adjustment; however, the problem here is the lack of automatic adjustment, so that a chain can stretch and malfunction before the need to adjust the bolt is detected.

Accordingly, there is a need for a device that is automatically adjustable, that has infinitely varying ratcheting capability, and that is not hydraulic, i.e. does not require seals.

SUMMARY OF THE INVENTION

It is a major object of the invention to provide a solution to the above described problems and difficulties. Basically a tensioner which meets the described need, comprises:

(a) body means having a bore therein, (b) a plunger carried by the body means and movable axially relative thereto in the bore, and a first compression spring urging the plunger axially in a first direction to exert biasing force operable to tension said flexible element, (c) the body means including an outer body defining a recess and an inner body movable axially within said recess, the inner body having an interior ramp surface facing the plunger which extends in said recess and penetrates the inner body, the ramp surface tapering inwardly in a second direction which extends generally opposite said first direction, and (d) wedgable means located between the ramp surface and the plunger, and urging means urging the wedgable means into wedging engagement with the ramp surface and the plunger whereby the plunger may be displaced by the first spring in said first direction, but is blocked against displacement in said second direction.

As will appear, the ramp surface is typically frusto-conical and coaxial with the plunger; the wedgeable means may comprise multiple rollers such as balls spaced about the axis, in non-rollable wedging engagement with the ramp surface and the plunger as the latter advances; and means yieldably urging the rollers or balls toward such wedging interengagement may comprise an annular part movable or slidable along the plunger, and a second spring urging that part against all the balls. An additional spring is typically located in the recess to urge the inner body, or cup, in the first direction, assisting the first spring. Also, means is provided to releasably lock the plunger in selected retracted position so the the device may be assembled to an engine or other support and then released to allow the plunger to tension the flexible element. Finally, the device is easily fitted in a positioning mount attached to an engine housing (or other structure), as will be seen.

These and other objects and advantages of the invention, as well as the details of an illustrative embodiment, will be more fully understood from the following description and drawings, in which:

DRAWING DESCRIPTION

FIG. 1 is a vertical section through a chain tensioning device incorporating the invention;

FIG. 2 is a horizontal section taken on lines 2—2 of FIG. 1;

FIG. 3 is a view of the FIG. 1 tensioner carried by a holder;

FIG. 4 is a schematic representation of two of the tensioners, carried by the holders, and tensioning two cam shaft driving chains, on an engine;

DETAILED DESCRIPTION

Figure 5:
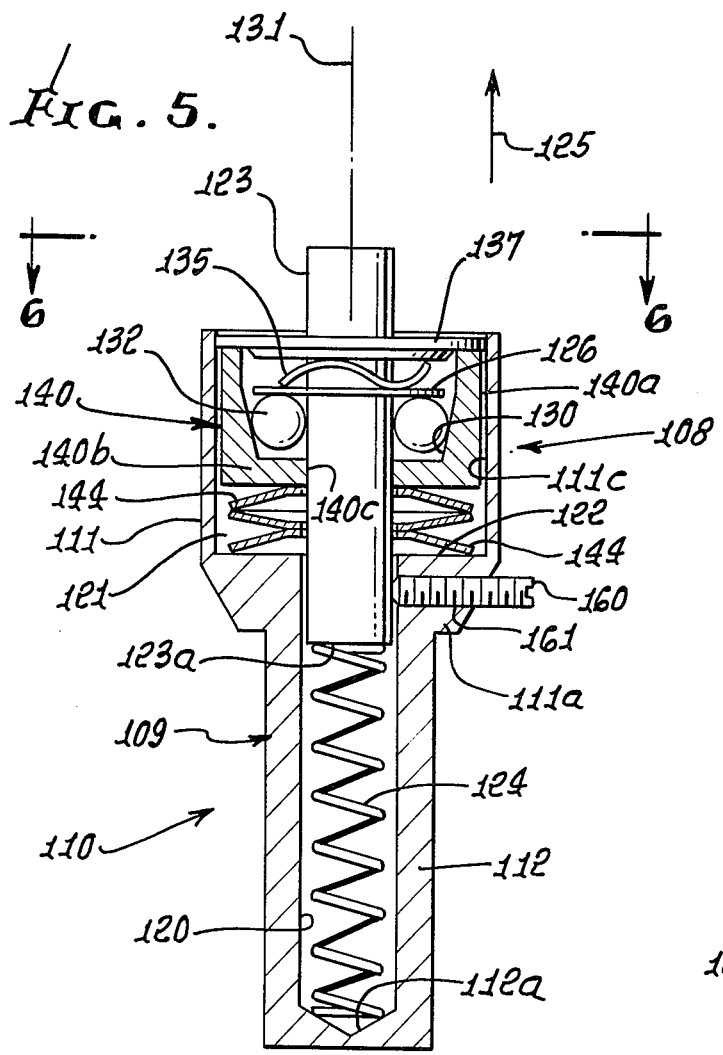
FIG. 5 is a view like FIG. 1, showing a modification.

In the drawings, the mechanically ratcheting tensioner 10 (for tensioning a chain, belt, or other flexible element) includes an axially elongated body having a head 11 on an elongated stem portion 12. The head may for example include external step shoulders 11a and 11b, the former being engageable with the end 13 of a mount or holder 14 when the stem portion 12 is inserted into a bore or socket 15 defined by the holder. The remainder of the holder includes an angularly extending member 16 containing openings 17 and 18 to receive fasteners that connect the holder to a support such as an engine housing, as for example as indicated at 19 in FIG. 4.

Referring again to FIG. 1, the body contains a bore 20 extending within the stem portion 12 and within the lower portion of the head 11, the bore opening to a recess 21 in the head at the location of annular interior step shoulder 22. A plunger rod 23 is movable axially in the bore, and a spring 24 in the bore urges the plunger in the direction indicated by arrow 25. Compression spring 24 is retained between the lower end 23a of the plunger and the bottom interior wall 12a of the body stem portion 12. FIG. 3 shows that the plunger transmits spring force to one arm 25a of a bell crank 25 pivoted at 25b, the other arm 25c of the crank carrying an idler roller or spool 26 which engages the side of a chain 27 to deflect the latter and thereby tension it.

Referring again to FIG. 1, the body head 11 defines an interior ramp surface 30 which faces the plunger, and which tapers in the axial direction opposite that of arrow 25. The axis appears at 31. Surface 30 is typically frusto-conical and is coaxial with the axis 31. Rollable means are located between the ramp surface 30 and the outer cylindrical surface of the plunger, such rollable means typically comprising multiple rollers such as balls 32, as for example eight balls spaced side-by-side in a ring about the plunger. In addition, means is provided to yieldably urge the rollable means into wedging engagement with the ramp surface and with the plunger, whereby the plunger may be displaced endwise by the spring in axial direction 25, but is blocked against displacement in the opposite axial direction. Accordingly, mechanical "infinite" ratcheting tensioning is provided to constantly urge the chain or other element in a tensioning direction (see direction 33 in FIG. 3) and to move in that direction as the chain or other element wears or stretches, but to block sideward vibration of the latter by preventing its lateral movement in the reverse lateral direction (see arrow 34 in FIG. 3).

As shown in FIG. 1, the means to yieldably urge the balls into wedging interengagement with the ramp surface 30, and the plunger, typically and advantageously comprises a second compression spring 35, and an annular part such as a washer 36 fitting about, i.e. centered by the plunger and interposed between the spring and the balls. A cap 37 is removably retained in the head, as by fasteners 38, to provide a backer surface, the spring 35 compressively retained between that surface and the washer. The spring is characterized as providing sufficient force, transmitted to the balls by the washer, as to prevent rolling of the balls as the plunger moves in the direction 25. To this end, the angle α of ramp surface 30 from axis 31 should be less than 45°, and typically should be between 15° and 25°. For best results, angle α should be about 19°.

FIG. 4 shows two mechanical chain tensioners 10, carried by mount 14, exerting tensioning force transmitted to chain stretches 127a and 227a. The latter are associated with chains 127 and 227 that are typically driven by sprockets 50 on the engine crank shaft, the chains in turn driving the sprockets 51 and 52 on engine cam shafts.

FIG. 1 also shows a means such as a set screw 60 having adjustable threaded connection at 61 with the head 11, to engage the plunger 23 and lock it in selected retracted position. This allows the device to be fitted into the socket 15 with plunger 22 and crank 25 retracted to allow the roller 26 to be fitted to the chain; thereafter, the set screw is released, and the plunger is advanced by spring 24 to tension the chain 27.

The rollers or balls referred to above comprise one form of wedgable means in the environment of the invention, other forms being usable.

Figure 6:
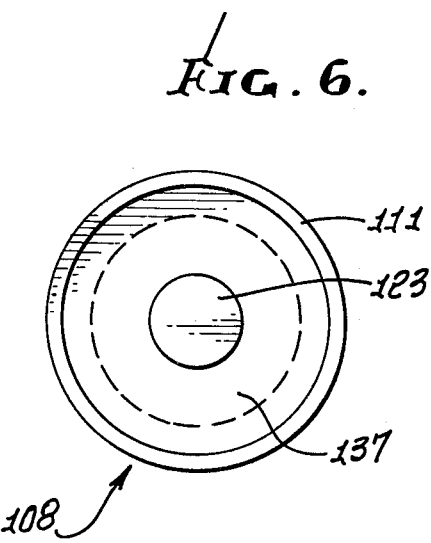
FIG. 6 is a top plan view on lines 6—6 of FIG. 5.
Figure 7:
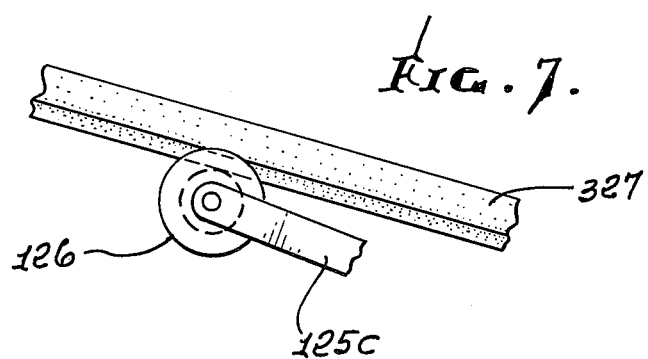
FIG. 7 is a fragmentary view like FIG. 3.

Referring now to FIGS. 5 and 6, the tensioner 110 (for tensioning a chain, belt, or other flexible element) includes an axially elongated body means 108 including outer body 109 having a head 111 on an elongated stem 112. The head defines an external step shoulder 111a similar to step shoulder 11a in FIG. 1. The body means contains a bore 120 extending within stem portion 112, the bore opening to a recess 121 in the head at the location of annular interior step shoulder 122. A plunger rod 123 is movable axially in the upper portion of the bore, and a compression spring 124 in the bore 120 urges the plunger in the first axial direction indicated by arrow 125. That spring is retained between the lower end 123a of the plunger and the bottom interior wall 112a of the body stem 112. The plunger is adapted to transmit spring force to an element to be tensioned, such as a chain, belt, etc. An elastomeric V-belt to be tensioned is indicated at 327 in FIG. 7. The plunger may transmit force to a bell crank as shown at 25 in FIG. 3, and to an idler carried by the crank and engaging the flexible element. See for example idler 126 carried by crank arm 125c in FIG. 7 (corresponding to idler 26 and arm 25c in FIG. 3).

Referring again to FIG. 5, the body means 108 also includes an inner body 140 movable axially in the recess 121, and typically having a cylindrical outer surface 140a in slidable engagement with the cylindrical bore 111c of the outer body head 111. The inner body is cup-shaped, having an annular end wall or base 140b defining a central opening 140c through which the plunger 123 extends. The inner body 140 has an interior ramp surface 130 which faces the plunger, and which tapers in the axial direction opposite that of arrow 125. The axis appears at 131. Surface 130 is typically frustoconical, and is coaxial with axis 131. Wedgable means such as rollers, typically in the form of multiple steel balls 132, are located between the ramp surface an the outer cylindrical surface of the plunger. Typically, eight balls are located in circularly spaced, side-by-side relation about the plunger.

In addition, urging means such as wavy spring 135, are provided to urge the wedgable means into wedging engagement with the ramp surface and the plunger, whereby the plunger may be displaced by the first spring 124 in the first direction 125, but is blocked against displacement in the second axial direction (opposite to arrow 125). The advantages of this construction are referred to above. An annular part such as a washer 126 fits about the plunger and is interposed between spring 135 and the balls 132 to transmit force equally thereto. A backer or cap 137 on the inner cap 140 retains the wavy spring 135 in position and under tension, to exert force transmitted to the balls 132, resisting rolling thereof as the plunger moves in direction 125. The ramp angularity is as described above in connection with FIG. 1.

An additional spring is provided in the recess 121, for urging the inner body or cap 140 in the first direction 125. Such additional spring may take the form of one or more annular Belleville washers 144, through which the plunger extends. Those washers are confined between step shoulder 122 and cup base 140b, and assist the spring 124 in yieldably urging the cup 140 in the direction 125.

The top of the head 111 is open to allow the cup 140 to at times move upwardly above the rim level of the head.

Set screw 160 has threaded connection at 161 with the head 111, to engage the plunger 123 and lock it in selected retracted position, with the functions and advantages the same as discussed above for set screw 60 in FIG. 1.

I claim:

1. A tensioning device for tensioning a flexible element, comprising
   (a) body means having a bore therein,
   (b) a plunger carried by the body means and movable axially relative thereto in the bore, and a first compression spring protectively confined by the body means in alignment with the plunger for urging the plunger axially in a first direction to exert biasing force operable to tension said element,
   (c) the body means including an outer body defining a recess and an inner cup-shaped body movable axially within said recess, said bore intersecting said recess, the first compression spring located in said bore, the inner body having an interior ramp surface facing the plunger, said plunger extending in said recess and penetrating through the inner body, the ramp surface tapering inwardly in a second direction which extends generally opposite said first direction, and (d) wedgable means located between the ramp surface and the plunger, and urging means urging the wedgable means into wedging engagement with the ramp surface and the plunger whereby the plunger may be displaced by the first spring in said first direction, but is blocked against displacement relative to the inner body in said second direction, (e) and an additional spring in said recess urging said cup-shaped body in said first direction and to permit limited movement of said plunger in said second direction.

2. The combination of claim 1 wherein said ramp surface is frusto-conical, the cup having an annular end wall toward which the ramp surface tapers, the plunger centrally penetrating said end wall.

3. The combination of claim 1 wherein said additional spring comprises annular Belleville spring means through which said plunger extends.

4. The combination of claim 1 wherein said wedgable means comprises multiple rollers spaced about said axis.

5. The combination of claim 4 wherein said rollers comprise balls.

6. The combination of claim 1 wherein said urging means comprises a second spring extending in said inner body.

7. The combination of claim 6 including a part in said inner body engaging the wedgable means, a backer surface on the inner body, and said second spring compressed between the backer surface and said part.

8. The combination of claim 1 including a means to releasably lock the plunger in a selected retracted axial position, whereby the plunger may be released to extend and exert a biasing force on said element.

9. The combination of claim 1 including an element engaging idler operatively connected with the plunger.

10. The combination of claim 1 including a bell crank having two arms, one arm mounting the idler, and the other arm operatively connected to the plunger.

11. The combination of claim 1 including a mount connectible to an engine, the mount interfitting said body means.

12. The combination of claim 11 wherein the mount defines a socket, and the body means is received in said socket, in coaxial relation therewith.

* * * * *